United States Patent Office 3,440,068
Patented Apr. 22, 1969

3,440,068
AMORPHOUS GLASS COMPOSITIONS
Robert J. Patterson, Dallas, and Andre E. Tilton, Plano, Tex., assignors to Texas Instruments Incorporated, Dallas, Tex., a corporation of Delaware
Filed Dec. 21, 1966, Ser. No. 603,623
Int. Cl. C03c 3/30, 13/00
U.S. Cl. 106—47    3 Claims

ABSTRACT OF THE DISCLOSURE

Disclosed are compositions of matter comprising germanium, selenium, and tellurium, many samples of which have been found to be glasses transmitting in the infrared region of the electromagnetic spectrum, and some of which have been found to be crystalline. Also disclosed are methods of compounding these compositions, and an illustration of the use of the glass compositions of this invention as a transmitting element within an infrared detection system.

---

This invention relates to amorphous compositions of matter. More particularly it relates to infrared transmitting glasses.

The invention disclosed herein pertains to a new region of germanium-selenium-tellurium compositions found to be amorphous glasses transmitting in the infrared region of the electromagnetic spectrum. This region is separate and distinct from that region of compositions disclosed in copending patent application Ser. No. 450,125, filed Apr. 22, 1965, now U.S. Patent 3,348,045, and assigned to Texas Instruments Incorporated, also the assignee of the present application.

The invention provides amorphous glass compositions having good transmission in the 1–16 micron wavelength region of the electromagnetic spectrum. The glass of the invention may contain about 25 to 40 atomic percent germanium, 57–65 atomic percent selenium, and from greater than 0 to 13 atomic percent tellurium, and may be made by reacting the constituents at 800° C. to 900° C. to form a melt and quench cooling the melt in air at room temperature.

It is therefore an object of the invention to provide a ternary amorphous glass composition comprising from 25–40 atomic percent germanium, 57–65 atomic percent selenium, and from greater than 0–13 atomic percent tellurium.

Another object of the invention is to provide a ternary germanium-selenium-tellurium amorphous glass composition exhibiting a high softening point and good transmittance at high temperatures in the 1–20 micron wavelength region of the electromagnetic spectrum.

A further object of the invention is to provide a ternary germanium-selenium-tellurium amorphous glass composition having the high resistance to decomposition and devitrification required for the remelting and slow-cooling operations associated with casting.

Figure 1:
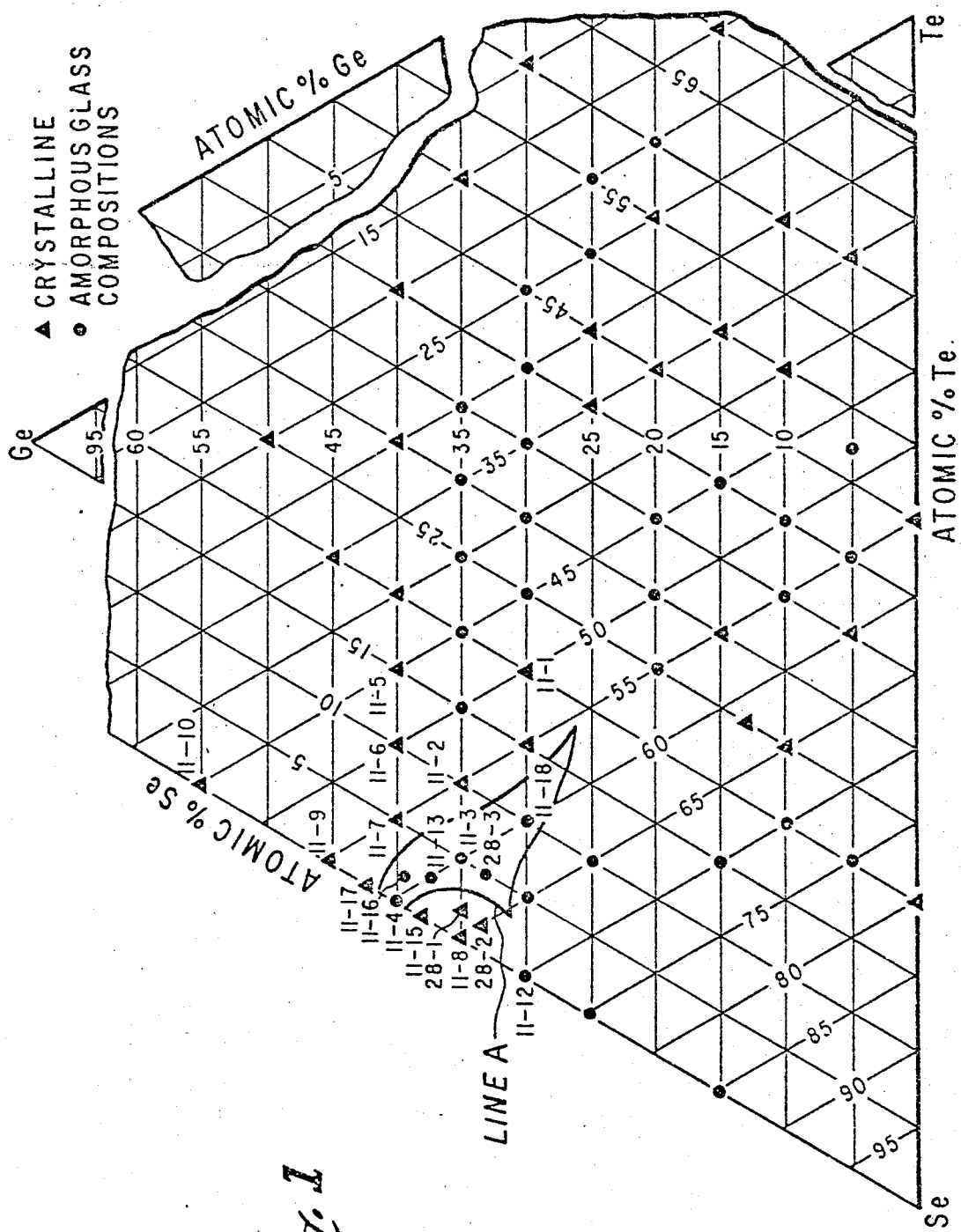

These and other objects, advantages, and features of the invention will become more readily apparent from the following detailed description when read in conjunction with the appended claims and attached drawings wherein:

FIGURE 1 depicts a ternary diagram of the atomic percentage of germanium, selenium, and tellurium for various amorphous compositions of matter of the invention. The ternary diagram also shows those compositions disclosed in the aforementioned copending application Ser. No. 450,125.

Figure 2:
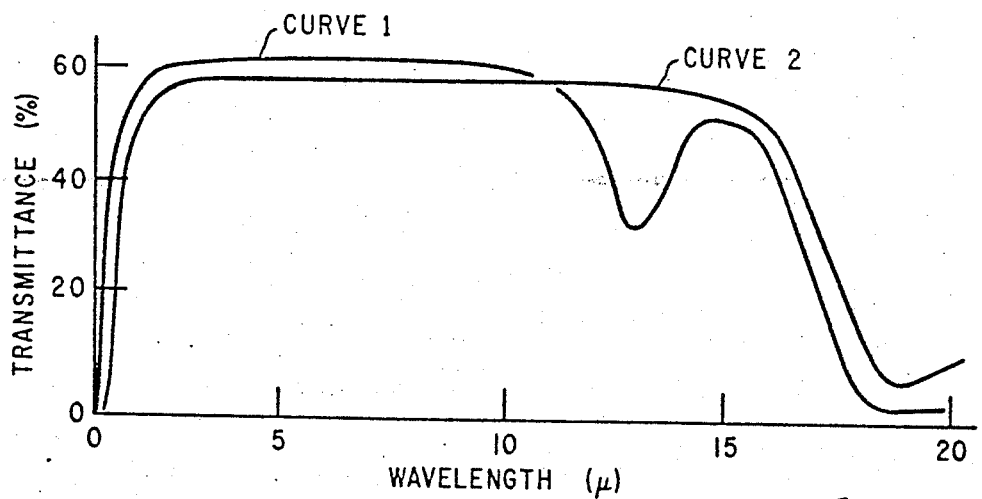
Figure 3:
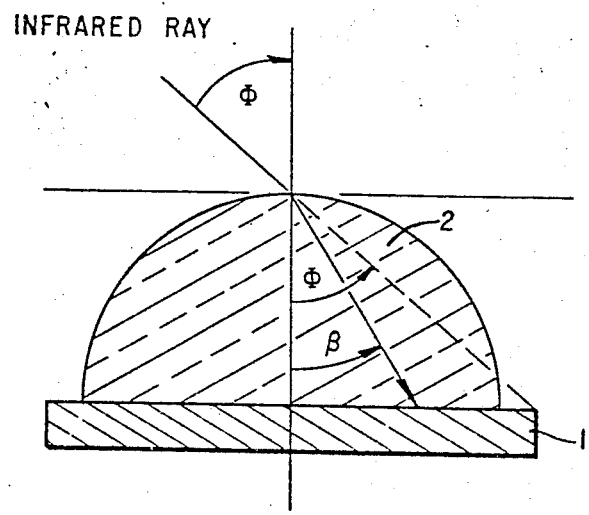

FIGURE 2 is a graphical representation of percent transmission at room temperature at various wavelengths of the electromagnetic spectrum for various glass compositions according to the invention; and FIGURE 3 illustrates one particular form of the glass composition of this invention, usable as an infrared transmitting element, such as a dome or lens, within an infrared detection system.

Referring to FIGURE 1, various compositions of germanium, selenium, and tellurium were compounded and evaluated to determine whether they were amorphous or crystalline. The general procedure for making the various compositions is described hereinafter.

Various atomic percentages of germanium, selenium, and tellurium were chosen for each sample to be made. The appropriate amounts of the constituents were weighed and then placed in a previously cleaned quartz ampoule. An example of a suitable cleaning step for the ampoule is brushing in a suitable detergent solution, rinsing thoroughly in deionized water, and then drying. The total weight of each of the samples was between five and 15 grams. The constituents were placed in the cleaned tube, evacuated to about $10^{-3}$ torr, and sealed. The sealed tube was then placed in a furnace and gradually heated to a temperature of about 800° C. to 900° C. and held at that temperature for about 16 hours to provide sufficient time for the constituents to react completely with each other. The furnace was a rocking furnace which may be of any suitable design to provide agitation of the constituents so as to achieve complete reaction thereof. The samples were then removed from the furnace and held in a vertical position in air for air quenching and allowed to cool to room temperature. Care was taken throughout the process to prevent heating the constituents in air to avoid causing any oxide formation. In particular, in some cases the inside surface of the ampoule was carbon coated for the purpose of chemically reducing any extraneous oxides present.

The same compositions which failed to form amorphous glass by the air quench-cooling technique and were crystalline after quenching are presented in Table I below, whereas the compositions which formed amorphous glass are presented in Table II below, with the softening point results obtained for the glass. The softening point is defined as the temperature at which a pointed quartz rod under a 70 gram load penetrates a smooth surface to a depth of 0.05 mm. where the rod is in perpendicular alignment with respect to the sample, and the point defines a 90° included angle. The reaction conditions for the samples in Tables I and II below were the same:

TABLE I.—CRYSTALLINE COMPOSITIONS

| Sample No. | Composition (atomic percent) | | |
|---|---|---|---|
|  | Ge | Se | Te |
| 11-1 | 30 | 50 | 20 |
| 11-2 | 35 | 55 | 10 |
| 11-5 | 40 | 45 | 15 |
| 11-6 | 40 | 50 | 10 |
| 11-7 | 40 | 55 | 5 |
| 28-1 | 35 | 63 | 2 |
| 28-2 | 33 | 65 | 2 |
| 11-8 | 35 | 65 | 0 |
| 11-15 | 38 | 62 | 0 |
| 11-17 | 42 | 58 | 0 |

TABLE II.—AMORPHOUS GLASS COMPOSITIONS

| Sample No. | Composition (atomic percent) | | | Softening point (° C.) |
|---|---|---|---|---|
|  | Ge | Se | Te |  |
| 28-3 | 33 | 62 | 5 | 355 |
| 11-13 | 37 | 60 | 3 | 354 |
| 11-16 | 39 | 59 | 2 | 345 |
| 11-3 | 35 | 60 | 5 | 342 |
| 11-18 | 30 | 60 | 10 | 327 |
| 11-4 | 40 | 60 | 0 | |

In FIGURE 1, the peripheral line A generally circumscribes the amorphous compositions of germanium-selenium-tellurium disclosed in patent application Ser. No. 450,125, cited above. Lines A, B, and C delineate the amorphous compositions of germanium-selenium-tellurium according to the present invention. The samples which fail to form amorphous glass by the air quench-cooling techniques (listed in Table I) are plotted in FIGURE 1 by block triangles and identified by sample numbers. The sample compositions forming amorphous glass (listed in Table II) are also plotted in FIGURE 1 within the area circumscribed by lines A, B and C and designated by black dots, each dot being identified by a sample number.

FIGURE 2 is a graph showing percent transmittance of radiation in the 1 to 20 micron wavelength region of the infrared spectrum at room temperature. Curve 1 represents a "typical" set of transmission characteristics common to the amorphous glass compositions listed in Table II. A moderately strong absorption band at 13 was observed, as shown by curve 1, due in large part to the presence of extraneous oxides in these represented compositions. This absorption band was substantially eliminated, however, when the ampoule in which the samples were prepared had its inside surface initially carbon coated in order to reduce these oxides. The resulting curve, after elimination of the absorption band, is represented by curve 2.

These amorphous compositions also have good transmittance at high temperature, because they are glassy and devoid of discrete band structure. Therefore, they do not exhibit the free carrier absorption at high temperature common to crystalline semiconductor materials.

FIGURE 3 depicts a form of the glass compositions of this invention usable within a particular infrared detecting system. The detecting system is normally composed of a detector 1 having a responsive element sensitive to infrared energy striking its surface, and an infrared transmitting element 2 such as a dome or lens in optical connections with the detector. The optical properties of the amorphous glass compositions of this invention make them particularly suited, among other applications, for use as the transmitting element 2. In addition to being substantially transparent to infrared rays over a broad range of the infrared spectrum, as depicted in FIGURE 2, all of the compositions have relatively high indexes of refraction, ranging from approximately 2.3 to 3.0 at 3–5$\mu$ wavelength. Consequently, when infrared rays strike the dome 2 at the incident angle $\Phi$, as pictured in FIGURE 3, the high index of refraction of the dome material causes the rays to be bent toward the detector unit 1 at the angle of refraction $\beta$, thus increasing the efficiency of detection.

The amorphous glass compositions of this invention offer substantial advantages for the fabrication of transmitting elements for a variety of other reasons. First, these compositions offer substantial advantages over crystalline material in that they may be heated to a plastic state and easily cost or worked into desired shapes and sizes. Second, the glasses of the invention have softening points higher than most glasses in the Ge-Se-Te system. Third, these high softening points, and general strength and hardness, offer greater ease in grinding, polishing, and handling operations, as well as stability to thermal shocks.

Of particular value are those Ge-Se-Te compositions containing 60 atomic percent Se. Those compositions comprising 40 minus Y atomic percent germanium, 60 atomic percent selenium, and Y atomic percent tellurium where Y is from greater than 0 through 12, can be cast, i.e., remelted and slow-cooled, without decomposition or devitrification. It has further been found that compositions of the above general formula, $Ge_{40-Y}Se_{60}Te_Y$, have softening points higher than other castable glasses in the Ge-Se-Te system.

EXAMPLE 100 grams of $Ge_{35}Se_{60}Te_5$ were prepared by sealing the appropriate quantity of raw elements in an evacuated quartz ampoule, heating the contents to 870° C. for 76 hours while mechanically rocking the furnace, rapidly removing the ampoule to still air and allowing it to cool until solid.

The glassy material was placed in a quartz crucible and cast by melting and slow cooling. A casting temperature of 650° C. was maintained for 10 minutes. The melt was cooled at a rate of 8–9° C. per minute until solid at its softening point of 342° C.

The cast piece measured 2.8 inches by 1.3 inches by 0.2 inch. Transmission was 67.7% at 8–10 microns, 21% at 13 microns and 58.7% from 14.2 to 15.0 microns. Absorption at 13 microns was due to residual oxygen in the glass, which can be removed by the use of carbon as described above. The viscosity-temperature data for the glass indicated a strain point of 256° C., which is a projected maximum use-temperature for the glass.

Although the invention has been described with reference to a preferred method for making the amorphous compositions of matter, other methods may be resorted to without departing from the spirit and scope of the invention as defined by the appended claims.

What is claimed is:
1. Ternary glass compositions of germanium, selenium, and tellurium, circumscribed by line A in the ternary diagram of FIGURE 1.
2. A ternary glass composition consisting essentially of 40 minus Y atomic percent germanium, 60 atomic selenium, and Y atomic percent tellurium where Y is from greater than 0 through 12.
3. The glass composition $Ge_{35}Se_{60}Te_5$.

References Cited

UNITED STATES PATENTS 3,261,721  7/1966  Cornish _____ 23—315

OTHER REFERENCES

Borisova et al.: On Electrical Conductivity of Crystallizing Glasses in the System $GeSe_{1.5-x}As_x$ ($x < 0.5$), Bull. Leningrad Univ., No. 22, 1962, pub. Nov. 29, 1962, and received U.S.A. Feb. 2, 1963, pages relied upon 114 and 116.

HELEN McCARTHY, Primary Examiner.

U.S. Cl. X.R.

23—315